United States Patent [19]
Horton

[11] Patent Number: 5,835,920
[45] Date of Patent: Nov. 10, 1998

[54] DYNAMIC PAGE REDUCTION

[75] Inventor: Scott E. Horton, Clyde Hill, Wash.

[73] Assignee: U S West, Inc., Denver, Colo.

[21] Appl. No.: 694,230

[22] Filed: Aug. 8, 1996

[51] Int. Cl.$^6$ ................................................. G06F 17/27
[52] U.S. Cl. ............................................................ 707/517
[58] Field of Search .................................... 707/517, 518, 707/525

[56] References Cited

U.S. PATENT DOCUMENTS

| | | | |
|---|---|---|---|
| 4,709,348 | 11/1987 | Horn et al. | 707/525 |
| 4,889,439 | 12/1989 | Cook et al. | 400/706 |
| 4,928,252 | 5/1990 | Gabbe et al. | 395/102 |

OTHER PUBLICATIONS

Nelsen, "Mastering WordPerfect on the Macintosh," SYBEX Inc., pp. 56–9, 87–8, 113–7, 122–3, 204–5, 1988.
QuarkXPress, "Reference Manual," Quak, Inc., pp. S.2–4, S.14–16, 1986.

Primary Examiner—Anton Fetting
Attorney, Agent, or Firm—Brooks & Kushman

[57] ABSTRACT

The present invention relates to a method for reducing a page to include orphan lines on a subsequent page which includes determining whether a spatial reduction of the first page will create sufficient space for the orphan lines, selecting one of the spatial reduction methods if the spatial reduction method creates sufficient space for the orphan lines, given the maximum reduction capable for the first page and reducing and moving the set of lines according to the spatial reduction method selected.

5 Claims, 4 Drawing Sheets

DYNAMIC PAGE REDUCTION

TECHNICAL FIELD

This invention relates to a method for reducing a page to accommodate remaining lines known as "orphan" or "dangling" lines, which continue on a subsequent page.

BACKGROUND ART

In this era of mass marketing and distribution, efficient and cost-effective communication techniques are increasingly important. Most businesses and organizations utilize mass mailings as a means for reaching their targeted audience. Large-scale mailings, however, are expensive. Efforts have thus been focused on decreasing the associated costs of such mailing.

In terms of both the expense and environmental resources utilized, the amount of paper generated for each piece of mail should be reduced. Often mailings include multiple sheets of paper, with an end page having a few dangling lines. This problem is particularly troublesome for businesses which send out multiple carrier invoices in one mailing. For example, telephone carriers often provide a single billing invoice with combined statements from a local and long-distance carrier, each of which requires that its corresponding statement begin on a new sheet of paper. Often times, this practice results in the generation and mailing of many pages having but a few dangling lines. Given the frequency with which such mailings are distributed, and the cost of the unnecessary paper and postage charges, a reduction in the papers mailed would constitute a significant savings. In the telecommunication industry it has been estimated that a reduction in a single sheet of paper can reduce the weight of as much as 10% of the bills so that they qualify for a lower postal rate.

In addition, removing so called "orphan" or "dangling" lines increases the clarity of a document. When two or three lines of a document section or paragraph are dangling on a subsequent page, there is a break in the flow of the section and an accompanying reduction in the clarity of the document as a whole.

Consequently, a need exists for a method of generating documents, particularly mail pieces, wherein the accompanying text may be dynamically reduced so as to eliminate orphan lines.

SUMMARY OF THE INVENTION

It is a principal object of the present invention to provide an automated method for reducing the text of a first page of a document to include orphan lines from a second page.

It is a further object of the present invention to provide a method of determining whether a spatial reduction of the set of lines on the first page will create sufficient space for the orphan lines from the second page.

Yet still further, it is an object of the present invention to analyze spatial reduction methods and if possible select a spatial reduction method by which orphan lines from a second page of a document are moved to a space created on a first page.

In carrying out the above objects and other objects, the present invention provides a method for reducing the text of a first page of a document to include orphan lines on a second page. The method includes the step of determining whether a spatial reduction of a set of lines on the first page will create sufficient space for the orphan lines. This determination further involves the step of obtaining a predetermined maximum reduction value for the first page. Next, the set of lines on the first page is analyzed to determine an accumulated reduction value for each of the spatial reduction methods. If at least one of the analyzed spatial reduction methods has an accumulated reduction value less than the maximum reduction value for the first page, one of the spatial reduction methods is selected. An evaluation is then conducted as to whether the selected spatial reduction method has provided sufficient space on the first page for the orphan lines. Lastly, the lines on the first page are reduced in response to the selection of a spatial reduction method and the orphan lines are moved to the first page.

In carrying out the above objects, the present invention further provides a method for reducing the text of a first page of a document to include orphan lines on a second page. The method includes detecting a page break in the document to define the first and second page. The page break is then communicated to a processor. A set of characteristics for the first page, including spacing, formatting and sequencing requirements for the page are determined. These characteristics for the first page are then communicated to the processor. The next step involves determining whether a spatial reduction of a set of lines on the first page will create sufficient space on the first page for the orphan lines of the second page. This determination involves obtaining a predetermined maximum reduction value for the first page. The set of lines on the first page are then analyzed to determine an accumulated reduction value for each of the spatial reduction methods. If at least one of the spatial reduction methods has an accumulated reduction value less than the maximum reduction value for the first page, one of the spatial reduction methods is selected. There is then a reduction in the set of lines according to the selected spatial reduction method and a corresponding move of the orphan lines to the first page. The above steps are repeated until each page in the document is, if possible, reduced.

In carrying out the above objects, the present invention further provides a method of analyzing the set of lines on the first page to determine an accumulated reduction value for each of the spatial reduction methods.

The objects, features, and advantages of the present invention are readily apparent from the following detailed description of the best mode for carrying out the invention when taken in connection with the accompanying drawings.

BEST MODE FOR CARRYING OUT THE INVENTION

The present invention solves the problems presented by the prior art in producing documents where one or more pages are printed with a few lines dangling from the previous page so called "orphan" lines. With this invention, there is a determination with respect to the maximum reduction allowed for each page and analysis of the various types of spatial reduction methods, and a determination of whether any of the spatial reduction methods will produce enough space to incorporate the orphan lines from the second page.

It should be understood that the term "orphan" lines as used herein should be interpreted broadly to include a set of lines on a second page which continue from a first page, wherein the set of lines occupies less than one-half of a page. For example, when a paragraph is begun on a first page, and continued on a second page, wherein a few lines from the paragraph fall onto the second page, those lines are termed "orphan lines."

Throughout the specification, the term "spatial reduction method" as used herein should be interpreted broadly to include a method for reducing the height of a line, such that the space occupied by that line is reduced. Accordingly, the space occupied by a set of lines on a page can be spatially reduced by reducing the height of each line.

This invention is intended to allow a user to vary the spatial reduction methods or select the option of having no spatial reduction on a page by page basis. Accordingly, as the characteristics and format of a page changes from page to page, so can the applicable spatial reduction methods. A user can then select different spatial reduction methods for each page of a document, or select that certain pages have no spatial reduction. This level of flexibility is important in view of the multitude of page sizes, characteristics and contents which may affect the choice of a spatial reduction method.

Figure 1:
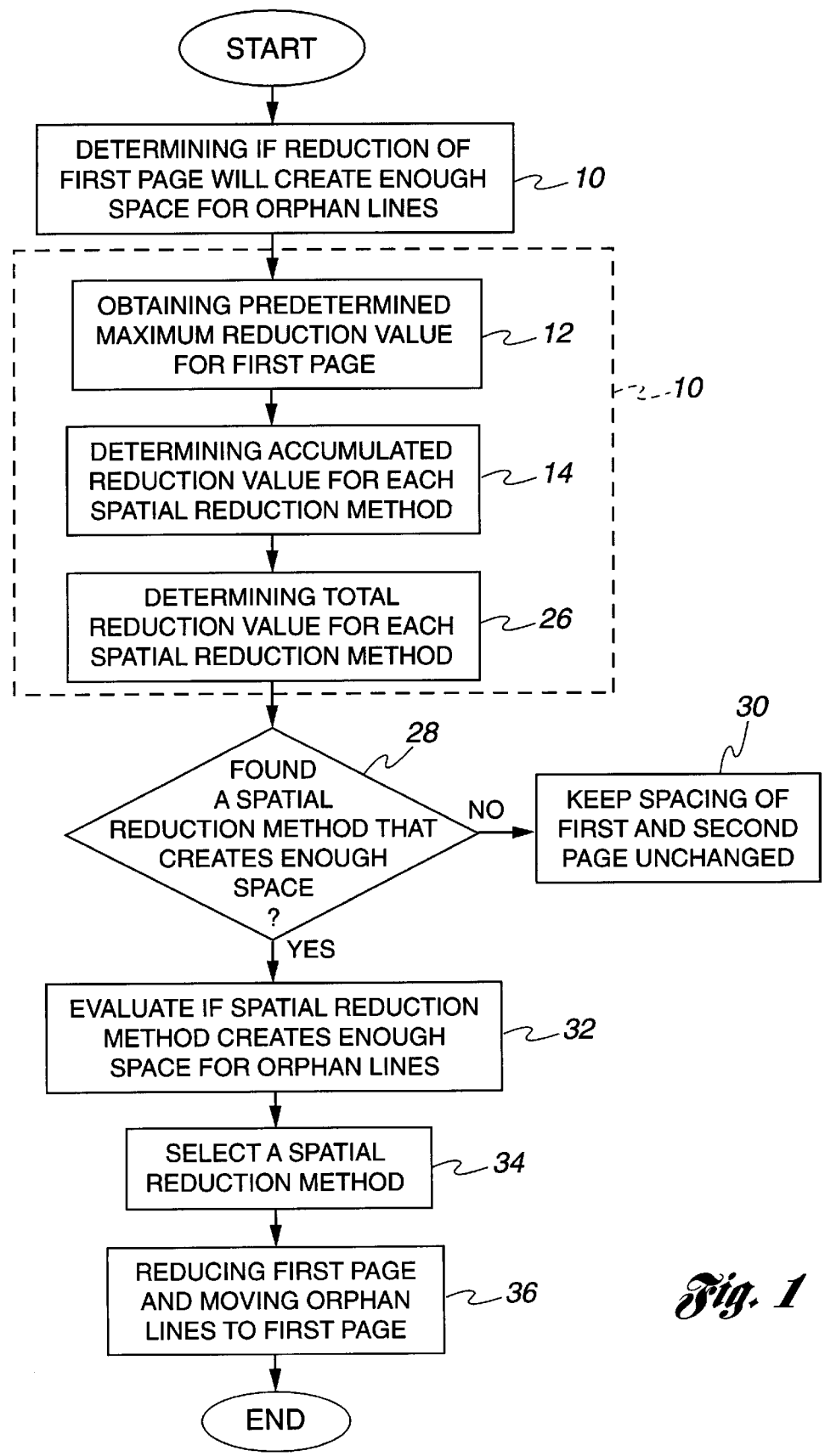
FIG. 1 is a flow diagram of a first embodiment of the method of the present invention.

Turning now to FIG. 1, a flow diagram of a preferred embodiment of the present invention is provided. As shown, the first step involves determining 10 whether a spatial reduction of a set of lines on the first page will create sufficient space for the orphan lines on the second page. To accomplish this step, a predetermined maximum reduction value for the first page must be obtained, 12.

A maximum reduction value for the first page is predetermined according to a set of characteristics for that page. These characteristics describe the formatting of the page and are obtained from a relational database, preferably d-base II. The following characteristics define how a page is formatted: 1) The overall page format (e.g. legal landscape, letter landscape, letter landscape back side, etc.); 2) The type of page header utilized; 3) The type of page footer utilized; 4) The length of the page in points (e.g. 72 points=1 inch); and 5) The type of page sequencing, or the order of the pages.

From these page characteristics the maximum amount of space that can be reduced for each page, the maximum reduction value, can be determined. This maximum reduction value should be predetermined and accessible for use in subsequent reduction calculations.

Referring to FIG. 1, the next step involves analyzing 14 the set of lines on the first page to determine an accumulated reduction value for each of the spatial reduction methods. An accumulated reduction value refers to the space occupied by the set of lines on the page following a spatial reduction. In the preferred embodiment, each of the spatial reduction methods, reduces the leading of every line in the page by a specified amount. The leading is defined as the space above and below each line.

Figure 2:
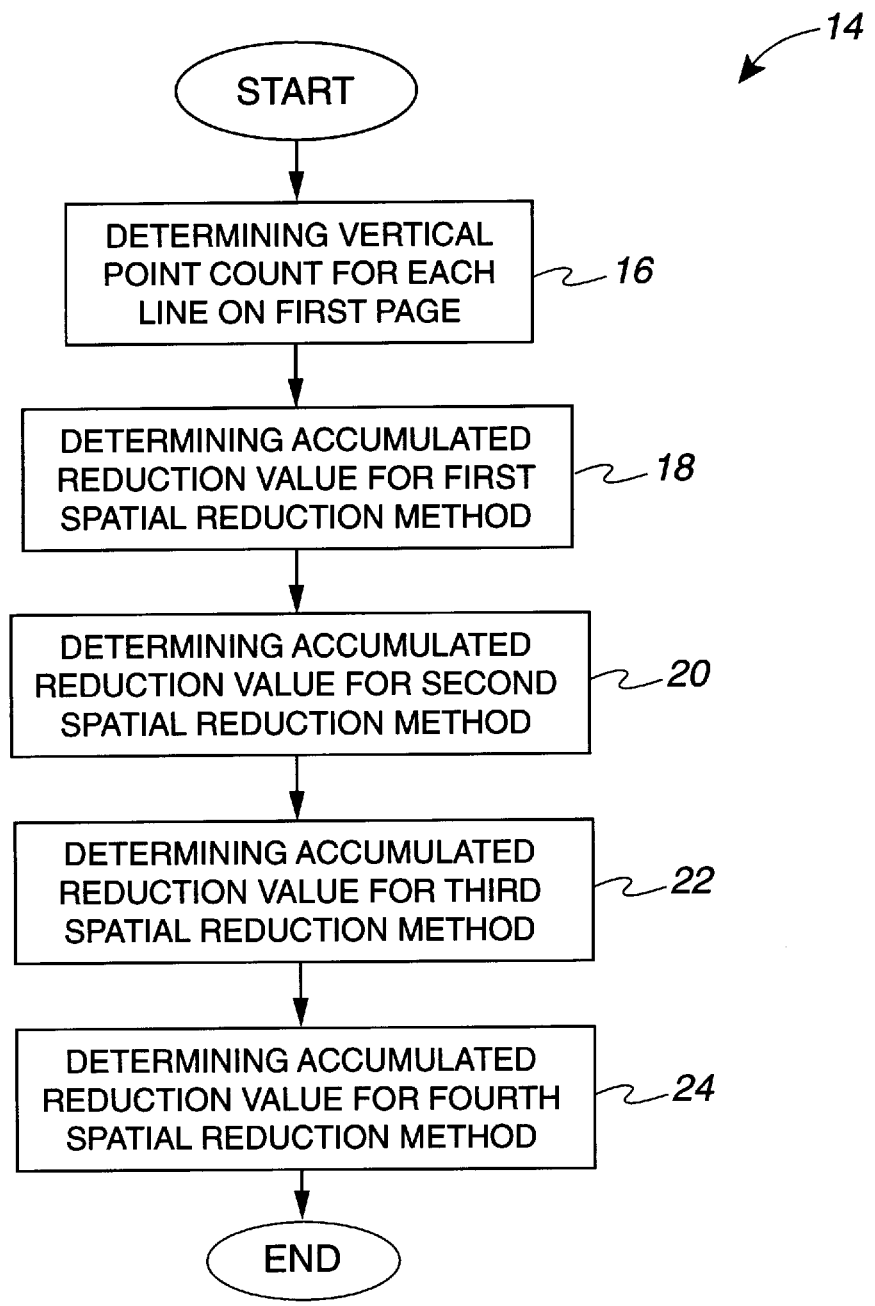
FIG. 2 is a diagram of a method for determining an accumulated reduction value for each of the spatial reduction methods.

Turning now to FIG. 2, which provides a detailed flowchart representation of step 14, to determine the amount of space occupied following each type of spatial reduction, the height of each line must be determined, 16. A vertical point count, the height in points, for each line is obtained from the d-base II tables.

To calculate the space occupied after a line is spatially reduced, requires, multiplying the vertical point count of the line by a reduction ratio, and rounding the results to the nearest whole number. The result is the height the line would be if it were reduced, a reduced vertical point count. Accordingly, for each type of spatial reduction ratio this general calculation is performed.

To obtain the total space occupied by the set of lines, the accumulated reduction value, under a given spatial reduction method requires adding the sum of the reduced vertical points counts.

Thus, for the first spatial reduction method, as provided in 18, the accumulated reduction value is calculated by multiplying the vertical point count of each line by a predetermined reduction ratio, which calculates a reduced vertical point count for each line, and adding the sum of the reduced vertical point counts to determine 18 the accumulated reduction value for the page.

Under 20, the accumulated reduction value for a second spatial reduction method is calculated. The second spatial reduction permits a user to designate certain lines for reduction. Thus, in contrast, to the first spatial reduction method, rather than all of the lines being reduced, with this method only lines specifically designated are reduced.

The accumulated reduction value for the second spatial reduction method is calculated by multiplying the vertical point count for the lines designated for reduction, by a predetermined reduction ratio, which calculates a reduced vertical point count for each of the lines designated for reduction. The sum of the reduced vertical point counts for the reduction designated lines are then added with the vertical point counts for the non-designated lines, to determine 20 the accumulated reduction value for the page under the second spatial reduction method.

The third spatial reduction permits a user to delete specific lines entirely. Accordingly, under this third spatial reduction method, a user can designate specific lines for deletion to reduce the space occupied by the set of lines.

The accumulated reduction value for a third spatial reduction method is determined 22 by deleting the vertical point count for each of a set of lines designated for deletion, and adding the sum of the vertical point counts for the non-designated lines to obtain the accumulated reduction value for the page.

The fourth spatial reduction permits a user to both delete specific lines and reduce specific lines to achieve the desired reduction. Thus, the accumulated reduction value for the fourth spatial reduction is determined 24 by deleting the vertical point counts for the lines designated for deletion, and multiplying the vertical point count for the lines designated for reduction, by a predetermined reduction ratio, which calculates a reduced vertical point count for each of the lines designated for reduction. The accumulated reduction value for the fourth spatial reduction method is then determined 24 by adding the sum of the reduced vertical point counts for the reduction designated lines with the vertical point counts for the non-designated lines.

The accumulated reduction values calculated for each of the spatial reduction methods are then added to the space occupied by the page header and page footer to determine 26 the total reduction value for the page, the total space occupied by the page. This total reduction value is calculated for each of the spatial reduction methods in the same manner.

What results is a calculation of the total space that would be occupied by the first page under each of the spatial reduction methods. Under the preferred embodiment, page headers and footers are not altered.

Referring back to FIG. 1, there is then a comparison between the total reduction values for each of the spatial reduction methods and the maximum reduction value allowed for that page 28. If the total reduction value for the page, the total space occupied by the page, for a specific spatial reduction method, is less than the maximum vertical point count for the page, that spatial reduction method can be utilized for the reduction. If however, the total vertical point count exceeds the maximum allowed, even if all possible lines were reduced (or deleted) on the page, there is insufficient space on the page for the reduction. If there is insufficient space, then no page reduction occurs and the spacing of the first and second page are kept unchanged 30.

If one or more of the spatial reduction methods has a total reduction value which is less than the maximum vertical point count for the page, then a user evaluates 32 these spatial reduction methods to determine whether there is sufficient space created for the orphan lines.

If one or more of the spatial reduction methods creates sufficient space for the orphan lines on the second page, the user can select 34 one of these spatial reduction methods.

The next step involves reducing 36 the space occupied by the set of lines on the first page 36 based on the spatial reduction method selected and moving the orphan lines to the first page. Thus, the first page is reduced and the orphan lines are moved to the new space that is created on the first page.

In this invention, the Y coordinate for a line determines the amount of vertical space occupied by a line, or the line's height. This y coordinate further assists in determining the amount of vertical space available before another line is written. Under most circumstances, the "Y" coordinate matches the true height of the font. For instance, data written in a Helvetica 8 point font will usually have a "Y" coordinate value of 8. If 7/8 ratio page reduction is applied, the value of 8 for the "Y" coordinate will change to 7. Therefore, when the data is formatted on the page, an 8 point font will write in 7 points of space. There is thus a reduction in the amount of space occupied by the data on a line. Notably, the font size does not change only the space occupied by the font.

Figure 3:
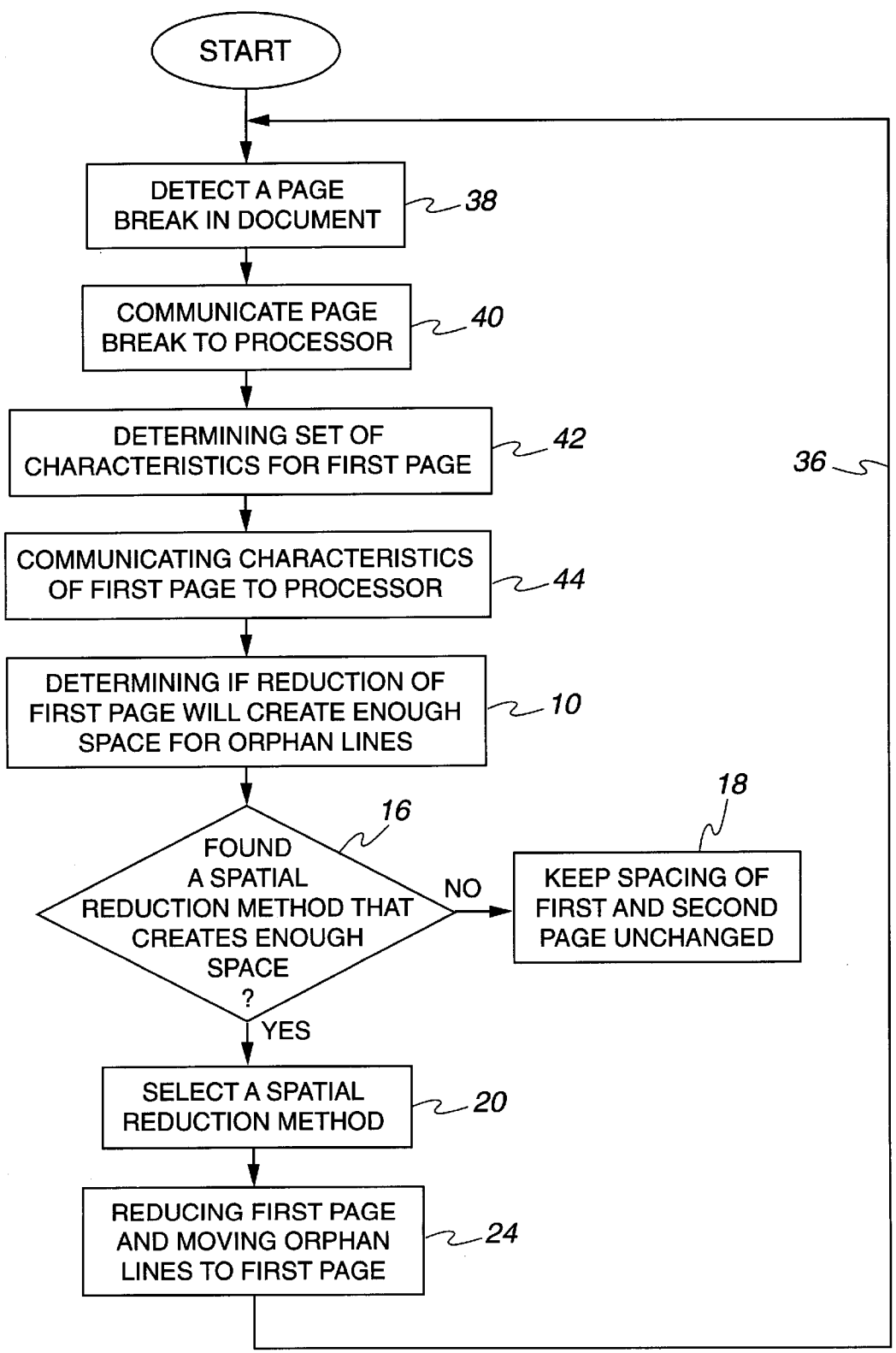
FIG. 3 is a flow chart diagram of a method for reducing a first page to include orphan lines on a second page within a document.

In an alternative embodiment, as shown in FIG. 3, a method of reducing a first page to include orphan lines on a second page, within a document, with the use of a computer having a memory and a processor, is disclosed. The first step involves detecting 38 when a page break occurs in a document. With the use of various document programs, page breaks are readily ascertainable. Once detected, this page break is then communicated 40 to a computer's processor. A set of characteristics for the first page are then determined 42 including spacing, formatting and sequencing requirements for the page. The set of characteristics are then communicated 44 to the processor.

From this point, the steps as shown in FIG. 1, are incorporated into the method depicted in FIG. 3. Accordingly, the following steps are included in this method: 1) determining 10 whether a spatial reduction of a set of lines on the first page will create sufficient space on the first page for the orphan lines of the second page, comprising: a) obtaining 12 a predetermined maximum reduction value for the first page; b) analyzing the set of lines on the first page to determine 14 an accumulated reduction value for each of a plurality of spatial reduction methods; c) determining 26 a total reduction value for the first page for each of the spatial reduction methods; selecting 34 one of the spatial reduction methods in response to at least one of the spatial reduction methods having a total reduction value less than the maximum reduction value for the first page; e) evaluating 32 whether the selected spatial reduction method provides sufficient space for the orphan lines; (f) reducing 36 the set of lines according to the selected spatial reduction method and moving the orphan lines to the first page in response to the selection of one of the spatial reduction methods; and repeating step 1 until each page in the document is, if possible, reduced. If no spatial reduction method creates enough space, keeping 30 the spacing of the first and second page unchanged.

Figure 4A:
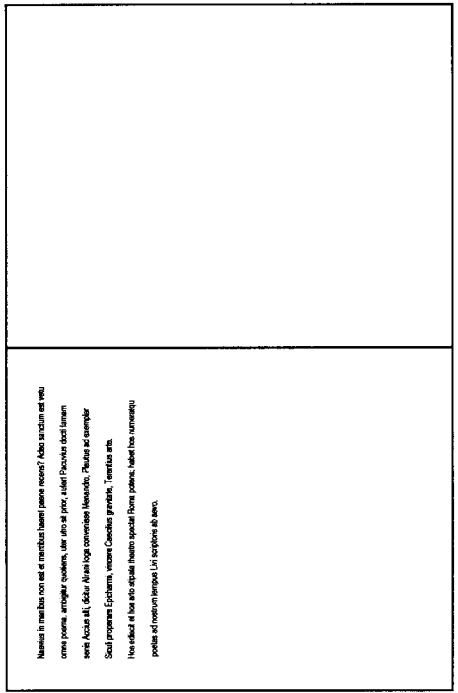
FIG. 4a is a pictorial diagram of a document having a first and second page, prior to any spatial reduction.
Figure 4A:
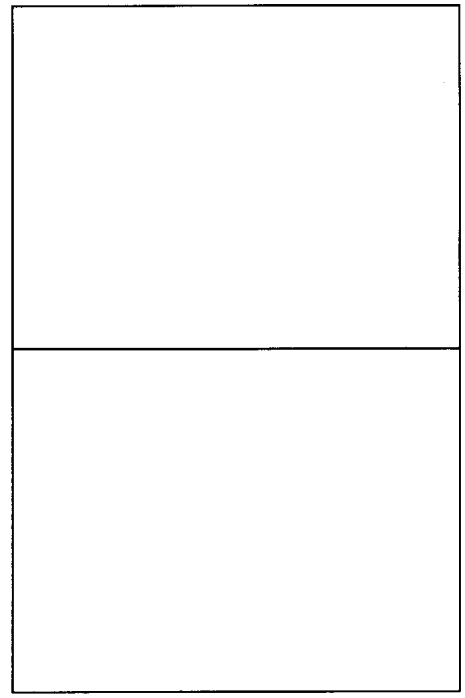
Figure 4B:
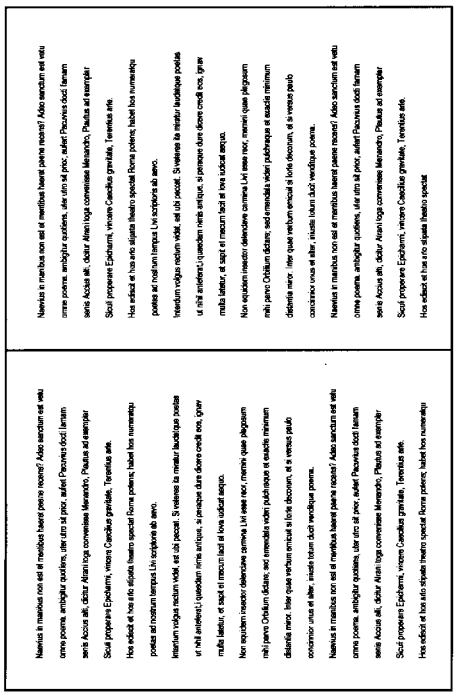
FIG. 4b is a pictorial diagram of the document from FIG. 4a, after the spatial reduction of the first page and including the orphan lines of the second page.
Figure 4B:
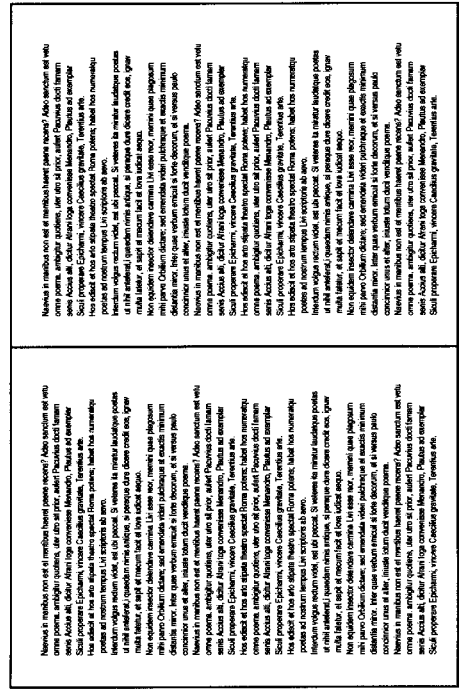

Referring to FIG. 4a, there is shown a first and second page before the application of a spatial reduction method. In this figure, the first page has the set of lines filling the page and the second page has a few orphan lines which continue the previous section. Following the spatial reduction, as shown in FIG. 4b, the space between the lines is reduced and thus sufficient space is created on the first page to accommodate the orphan lines from the second page.

In another preferred embodiment, designed for batch processing of documents, a user can pre-select a spatial reduction method to be used for a given type of page or if a page has a certain set of characteristics. Accordingly, under this alternative embodiment, a user can at the onset designate which type of spatial reduction method, if any, should be utilized depending on the type of page, page format or specific page characteristics, so that the process is completely automated rather than interactive on a page-by-page basis. For example, a user can designate that for any orphan lines appearing on a page of 8-½×11" size, every line of the previous page will be reduced by a predetermined reduction ratio. Notably, a user can select one or more spatial reduction methods to be applied given a specific set of page characteristics.

Under this alternative embodiment, a user can reduce a first page to include orphan lines on a second page, with a computer having a memory and a processor. In a preliminary step, the user determines a set of characteristics for the first page, including spacing, formatting and sequencing requirements for the page. Those characteristics once determined are then communicated to the processor. The user has the option to select at least one spatial reduction method in response to the characteristics of the first page. This spatial reduction selection is subsequently communicated to the processor. Notably, among the possible spatial reduction methods, there is the option for some or all of a page to have no spatial reduction. In the telecommunication industry, for example, where multiple carrier's invoices are combined, a particular carrier may not want any reduction in spacing for their invoice. The option to have no spatial reduction is thus an important one.

Following the selection of a spatial reduction method, a page break in the document is detected to define the first and second page, wherein the second page has orphan lines. This page break is communicated to the processor. Following the creation of a first and second page, it is determined whether the selected spatial reduction of a set of lines on the first page will create sufficient space on the first page for the orphan lines of the second page. In an effort to make this determination, a predetermined maximum reduction value is obtained for the first page; and the set of lines on the first page are analyzed to determine an accumulated reduction value for each of a plurality of spatial reduction methods. If the selected spatial reduction method has an accumulated reduction value less than the maximum reduction value for the first page, then the set of lines are reduced according to the selected spatial reduction method and the orphan lines are moved to the first page. If the selected spatial reduction method results in a set of lines on the first page having an accumulated reduction value more than the maximum reduction value for the first page, then spatial reduction method is not possible and the spacing of the first and second page remains unchanged.

Accordingly, the reduction methods disclosed in this invention, provides an option for the reduction of a page when possible and a corresponding shift of the orphan lines from the second page to the first page.

While the best mode for carrying out the invention has been described in detail, those familiar with the art to which this invention relates will recognize various alternative designs and embodiments for practicing the invention as defined by the following claims.

What is claimed is:

1. For use with a computer having a processor and a memory, a method for reducing a first page of a document to include orphan lines on a second page, comprising:
   determining whether a spatial reduction of a set of lines on the first page will create sufficient space for the orphan lines, comprising:
     obtaining a predetermined maximum reduction value for the first page;
     analyzing the set of lines on the first page to determine an accumulated reduction value for each of a plurality of spatial reduction methods;
     determining a total reduction value for the first page for each of the spatial reduction methods;
     selecting one of the spatial reduction methods in response to at least one of the analyzed spatial reduction methods having a total reduction value less than the maximum reduction value for the first page;
     evaluating whether the selected spatial reduction method provides sufficient space for the orphan lines; and
     reducing the set of lines according to the selected spatial reduction method and moving the orphan lines to the first page in response to the selection of at least one of the spatial reduction methods.

2. The method of claim 1, wherein the step of analyzing the set of lines on the first page to determine an accumulated reduction value for each of a plurality of spatial reduction methods, further comprises:
   determining a vertical point count for each line on the first page;
   determining the accumulated reduction value for a first spatial reduction method by multiplying the vertical point count of each line by a predetermined reduction ratio, which calculates a reduced vertical point count for each line, and adding the sum of the reduced vertical point counts to determine the accumulated reduction value for the page;
   determining the accumulated reduction value for a second spatial reduction method by multiplying the vertical point count for each of a set of lines designated for reduction, by a predetermined reduction ratio, which calculates a reduced vertical point count for each of the lines designated for reduction, and adding the sum of the reduced vertical point counts for the reduction designated lines with the vertical point counts for a set of non-designated lines, to obtain the accumulated reduction value for the page;
   determining the accumulated reduction value for a third spatial reduction method by deleting the vertical point count for each of a set of lines designated for deletion, and adding the sum of the vertical point counts for a set of non-designated lines to obtain the accumulated reduction value for the page; and
   determining the accumulated reduction value for a fourth spatial reduction method by deleting the vertical point counts for each of a set of lines designated for deletion, and multiplying the vertical point count for each of a set of lines designated for reduction, by a predetermined reduction ratio, which calculates a reduced vertical point count for each of the lines designated for reduction, and adding the sum of the reduced vertical point counts for the reduction designated lines with the vertical point counts for a set of non-designated lines to obtain the accumulated reduction value for the page.

3. The method of claim 2, wherein the step of reducing the set of lines according to the selected method and moving the orphan lines to the first page, further comprises:
   deleting the lines designated for deletion and reducing the vertical point count by the predetermined reduction ratio for the lines designated for reduction.

4. In a document, a method for reducing a first page to include orphan lines on a second page, with a computer having a memory and a processor, comprising:
   a) detecting a page break in the document to define the first and second page, the second page having orphan lines;
   b) communicating the page break to the processor;
   c) determining a set of characteristics for the first page, including spacing, formatting and sequencing requirements for the page;
   d) communicating the characteristics for the first page to the processor;
   e) determining whether a spatial reduction of a set of lines on the first page will create sufficient space on the first page for the orphan lines of the second page, further comprising:
     i) obtaining a predetermined maximum reduction value for the first page;
     ii) analyzing the set of lines on the first page to determine an accumulated reduction value for each of a plurality of spatial reduction methods; and
     iii) selecting one of the spatial reduction methods in response to at least one of the spatial reduction methods having an accumulated reduction value less than the maximum reduction value for the first page;
   f) reducing the set of lines according to the selected spatial reduction method and moving the orphan lines to the first page in response to the selection of one of the spatial reduction methods; and
   g) repeating steps (a–f) until each page in the document is, if possible, reduced.

5. In a document, a method for reducing a first page to include orphan lines on a second page, with a computer having a memory and a processor, comprising:
   a) determining a set of characteristics for the first page, including spacing, formatting and sequencing requirements for the page;
   b) communicating the characteristics for the first page to the processor;
   c) selecting at least one spatial reduction method in response to the characteristics of the first page;
   d) communicating the selection of the spatial reduction method to the processor;

e) detecting a page break in the document to define the first and second page, the second page having orphan lines;

f) communicating the page break to the processor;

g) determining whether the selected spatial reduction of a set of lines on the first page will create sufficient space on the first page for the orphan lines of the second page, further comprising:

i) obtaining a predetermined maximum reduction value for the first page; and ii) analyzing the set of lines on the first page to determine an accumulated reduction value for each of a plurality of spatial reduction methods; and h) reducing the set of lines according to the selected spatial reduction method and moving the orphan lines to the first page in response to the selection of a spatial reduction method which has an accumulated reduction value less than the maximum reduction value for the first page.

\* \* \* \* \*